US008457031B2

(12) United States Patent
Matta

(10) Patent No.: US 8,457,031 B2
(45) Date of Patent: Jun. 4, 2013

(54) SYSTEM AND METHOD FOR RELIABLE MULTICAST

(75) Inventor: Sudheer Poorna Chandra Matta, Tracy, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 664 days.

(21) Appl. No.: 11/330,877

(22) Filed: Jan. 11, 2006

(65) Prior Publication Data

US 2007/0160046 A1 Jul. 12, 2007

Related U.S. Application Data

(60) Provisional application No. 60/727,025, filed on Oct. 13, 2005.

(51) Int. Cl.
*H04H 20/71* (2008.01)
*H04L 12/28* (2006.01)
*H04L 12/56* (2006.01)

(52) U.S. Cl.
USPC ............................ 370/312; 370/390; 370/392

(58) Field of Classification Search
USPC ........................................................ 370/312
See application file for complete search history.

(56) References Cited

U.S. PATENT DOCUMENTS 3,641,433 A 2/1972 Mifflin et al.
4,168,400 A 9/1979 De Couasnon et al.
4,176,316 A 11/1979 DeRosa et al.
4,247,908 A 1/1981 Lockart et al.
4,291,401 A 9/1981 Bachmann
4,291,409 A 9/1981 Weinberg et al.
4,409,470 A 10/1983 Shepard et al.
4,460,120 A 7/1984 Shepard et al.
4,475,208 A 10/1984 Ricketts (Continued)

FOREIGN PATENT DOCUMENTS

EP 0 992 921 A2 4/2000
EP 1 542 409 A 6/2005

(Continued)

OTHER PUBLICATIONS

Johnson, David B, et al., "DSR The Dynamic Source Routing Protocol for Multi-Hop Wireless Ad Hoc Networks", Computer Science Department, Carnegie Mellon University, Nov. 3, 2005 (http://monarch.cs.rice.edu/monarch-papers/dsr-chapter00.pdf).*

(Continued)

*Primary Examiner* — Faruk Hamza
*Assistant Examiner* — Cassandra Decker

(57) ABSTRACT

A technique for reliable multicast involves identifying a client as an acknowledger of a wireless multicast packet, and having the acknowledger acknowledge receipt of the multicast packet. An example of a method according to the technique may include receiving a multicast packet, selecting a client associated with a destination of the multicast packet, identifying the client in the multicast packet, forwarding the multicast packet to wireless, and retrying forwarding the multicast packet with the client identified in the multicast packet if no acknowledgement is received from the client. An example of a system according to the technique may include a means for identifying a client, a means for putting the client mac in the header of a multicast packet, a means for sending the multicast packet with the client mac to a wireless multicast destination, and a means for receiving acknowledgement from the client associated with the client mac.

7 Claims, 6 Drawing Sheets

U.S. PATENT DOCUMENTS 4,494,238 A 1/1985 Groth, Jr.
4,500,987 A 2/1985 Hasegawa
4,503,533 A 3/1985 Tobagi et al.
4,550,414 A 10/1985 Guinon et al.
4,562,415 A 12/1985 McBiles
4,630,264 A 12/1986 Wah
4,635,221 A 1/1987 Kerr
4,639,914 A 1/1987 Winters
4,644,523 A 2/1987 Horwitz
4,672,658 A 6/1987 Kavehrad
4,673,805 A 6/1987 Shepard et al.
4,707,839 A 11/1987 Andren et al.
4,730,340 A 3/1988 Frazier
4,736,095 A 4/1988 Shepard et al.
4,740,792 A 4/1988 Sagey et al.
4,758,717 A 7/1988 Shepard et al.
4,760,586 A 7/1988 Takeda
4,789,983 A 12/1988 Acampora et al.
4,829,540 A 5/1989 Waggener et al.
4,850,009 A 7/1989 Zook et al.
4,872,182 A 10/1989 Mcrae et al.
4,894,842 A 1/1990 Brockhaven et al.
4,901,307 A 2/1990 Gilhousen et al.
4,933,952 A 6/1990 Albrieux et al.
4,933,953 A 6/1990 Yagi
4,955,053 A 9/1990 Siegmund
4,995,053 A 2/1991 Simpson et al.
5,008,899 A 4/1991 Yamamoto
5,027,343 A 6/1991 Chan et al.
5,029,183 A 7/1991 Tymes
5,103,459 A 4/1992 Gilhousen et al.
5,103,461 A 4/1992 Tymes
5,109,390 A 4/1992 Gilhousen et al.
5,119,502 A 6/1992 Kallin et al.
5,142,550 A 8/1992 Tymes
5,151,919 A 9/1992 Dent
5,157,687 A 10/1992 Tymes
5,187,675 A 2/1993 Dent et al.
5,231,633 A 7/1993 Hluchyj et al.
5,280,498 A 1/1994 Tymes et al.
5,285,494 A 2/1994 Sprecher et al.
5,327,144 A 7/1994 Stilp et al.
5,329,531 A 7/1994 Diepstraten
5,339,316 A 8/1994 Diepstraten
5,371,783 A 12/1994 Rose et al.
5,418,812 A 5/1995 Reyes et al.
5,444,851 A 8/1995 Woest
5,448,569 A 9/1995 Huang et al.
5,450,615 A 9/1995 Fortune et al.
5,465,401 A 11/1995 Thompson
5,479,441 A 12/1995 Tymes et al.
5,483,676 A 1/1996 Mahany et al.
5,488,569 A 1/1996 Kaplan et al.
5,491,644 A 2/1996 Pickering et al.
5,517,495 A 5/1996 Lund
5,519,762 A 5/1996 Bartlett
5,528,621 A 6/1996 Heiman et al.
5,542,100 A 7/1996 Hatakeyama
5,546,389 A 8/1996 Wippenbeck et al.
5,561,841 A 10/1996 Markus
5,568,513 A 10/1996 Croft et al.
5,570,366 A 10/1996 Baker et al.
5,584,048 A 12/1996 Wieczorek
5,598,532 A 1/1997 Liron
5,630,207 A 5/1997 Gitlin et al.
5,640,414 A 6/1997 Blakeney et al.
5,649,289 A 7/1997 Wang et al.
5,668,803 A 9/1997 Tymes et al.
5,677,954 A 10/1997 Hirata et al.
5,706,428 A * 1/1998 Boer et al. .................... 370/342
5,715,304 A 2/1998 Nishida et al.
5,729,542 A 3/1998 Dupont
5,742,592 A 4/1998 Scholefield et al.
5,774,460 A 6/1998 Schiffel et al.
5,793,303 A 8/1998 Koga
5,794,128 A 8/1998 Brockel et al.
5,812,589 A 9/1998 Sealander et al.
5,815,811 A 9/1998 Pinard et al.
5,828,653 A 10/1998 Goss
5,828,960 A 10/1998 Tang et al.
5,835,061 A 11/1998 Stewart
5,838,907 A 11/1998 Hansen
5,844,900 A 12/1998 Hong et al.
5,852,722 A 12/1998 Hamilton
5,862,475 A 1/1999 Zicker et al.
5,872,968 A 2/1999 Knox et al.
5,875,179 A 2/1999 Tikalsky
5,887,259 A 3/1999 Zicker et al.
5,896,561 A 4/1999 Schrader et al.
5,909,686 A 6/1999 Muller et al.
5,915,214 A 6/1999 Reece et al.
5,920,821 A 7/1999 Seazholtz et al.
5,933,607 A 8/1999 Tate et al.
5,938,721 A 8/1999 Dussell et al.
5,949,988 A 9/1999 Feisullin et al.
5,953,669 A 9/1999 Stratis et al.
5,960,335 A 9/1999 Umemoto et al.
5,969,678 A 10/1999 Stewart
5,970,066 A 10/1999 Lowry et al.
5,977,913 A 11/1999 Christ
5,980,078 A 11/1999 Krivoshein et al.
5,982,779 A 11/1999 Krishnakumar et al.
5,987,062 A 11/1999 Engwer et al.
5,987,328 A 11/1999 Ephremides et al.
5,991,817 A 11/1999 Rowett et al.
5,999,813 A 12/1999 Lu et al.
6,005,853 A 12/1999 Wang et al.
6,011,784 A 1/2000 Brown
6,012,088 A 1/2000 Li et al.
6,029,196 A 2/2000 Lenz
6,041,240 A 3/2000 McCarthy et al.
6,041,358 A 3/2000 Huang et al.
6,070,243 A 5/2000 See et al.
6,073,075 A 6/2000 Kondou et al.
6,073,152 A 6/2000 De Vries
6,078,568 A 6/2000 Wright
6,088,591 A 7/2000 Trompower
6,101,539 A 8/2000 Kennelly et al.
6,115,390 A 9/2000 Chuah
6,118,771 A * 9/2000 Tajika et al. .................. 370/328
6,119,009 A 9/2000 Baranger et al.
6,122,520 A 9/2000 Want et al.
6,144,638 A 11/2000 Obenhuber et al.
6,148,199 A 11/2000 Hoffman et al.
6,154,776 A 11/2000 Martin
6,160,804 A 12/2000 Ahmed et al.
6,177,905 B1 1/2001 Welch
6,188,694 B1 2/2001 Fine et al.
6,199,032 B1 3/2001 Anderson
6,208,629 B1 3/2001 Jaszewski et al.
6,208,841 B1 3/2001 Wallace et al.
6,212,395 B1 4/2001 Lu et al.
6,218,930 B1 4/2001 Katzenberg et al.
6,240,078 B1 5/2001 Kuhnel et al.
6,240,083 B1 5/2001 Wright
6,240,291 B1 5/2001 Narasimhan et al.
6,246,751 B1 6/2001 Bergl et al.
6,249,252 B1 6/2001 Dupray
6,256,300 B1 7/2001 Ahmed et al.
6,256,334 B1 7/2001 Adachi
6,259,405 B1 7/2001 Stewart et al.
6,262,988 B1 7/2001 Vig
6,269,246 B1 7/2001 Rao et al.
6,285,662 B1 9/2001 Watanabe
6,304,596 B1 10/2001 Yamano
6,304,906 B1 10/2001 Bhatti et al.
6,317,599 B1 11/2001 Rappaport et al.
6,326,918 B1 12/2001 Stewart
6,336,035 B1 1/2002 Somoza et al.
6,336,152 B1 1/2002 Richman et al.
6,347,091 B1 2/2002 Wallentin et al.
6,356,758 B1 3/2002 Almeida et al.
6,393,290 B1 5/2002 Ulfongene
6,397,040 B1 5/2002 Titmuss et al.
6,404,772 B1 6/2002 Beach et al.
6,421,714 B1 7/2002 Rai et al.
6,429,879 B1 8/2002 Sturgeon et al.

6,446,206 B1 9/2002 Feldbaum
6,456,239 B1 9/2002 Werb et al.
6,470,025 B1 10/2002 Wilson et al.
6,473,449 B1 10/2002 Cafarella et al.
6,493,679 B1 12/2002 Rappaport et al.
6,496,290 B1 12/2002 Lee
6,512,916 B1 1/2003 Forbes, Jr.
6,526,275 B1 2/2003 Calvert
6,535,732 B1 3/2003 McIntosh et al.
6,564,380 B1 5/2003 Murphy
6,567,146 B2 5/2003 Hirakata et al.
6,567,416 B1 5/2003 Chuah
6,574,240 B1 6/2003 Tzeng
6,580,700 B1 6/2003 Pinard et al.
6,587,680 B1 7/2003 Ata-Laurila et al.
6,587,835 B1 7/2003 Treyz et al.
6,603,970 B1 8/2003 Huelamo Platas et al.
6,614,787 B1 9/2003 Jain et al.
6,615,276 B1 9/2003 Mastrianni et al.
6,624,762 B1 9/2003 End, III
6,625,454 B1 9/2003 Rappaport et al.
6,631,267 B1 10/2003 Clarkson et al.
6,650,912 B2 11/2003 Chen et al.
6,658,389 B1 12/2003 Alpdemir
6,659,947 B1 12/2003 Carter et al.
6,661,787 B1 12/2003 O'Connell et al.
6,674,403 B2 1/2004 Gray et al.
6,677,894 B2 1/2004 Sheynblat et al.
6,678,516 B2 1/2004 Nordman et al.
6,678,802 B2 1/2004 Hickson
6,687,498 B2 2/2004 McKenna et al.
6,697,415 B1 2/2004 Mahany
6,721,334 B1 4/2004 Ketcham
6,725,260 B1 4/2004 Philyaw
6,738,629 B1 5/2004 McCormick et al.
6,747,961 B1 6/2004 Ahmed et al.
6,756,940 B2 6/2004 Oh et al.
6,760,324 B1 7/2004 Scott et al.
6,785,275 B1 * 8/2004 Boivie et al. .................. 370/390
6,798,788 B1 9/2004 Viswanath et al.
6,801,782 B2 10/2004 McCrady et al.
6,826,399 B1 11/2004 Hoffman et al.
6,839,338 B1 1/2005 Amara et al.
6,839,348 B2 1/2005 Tang et al.
6,839,388 B2 1/2005 Vaidyanathan
6,847,620 B1 1/2005 Meier
6,847,892 B2 1/2005 Zhou et al.
6,856,800 B1 2/2005 Henry et al.
6,879,812 B2 4/2005 Agrawal et al.
6,901,439 B1 5/2005 Bonasia et al.
6,917,688 B2 7/2005 Yu et al.
6,934,260 B1 8/2005 Kanuri
6,937,566 B1 8/2005 Forslow
6,938,079 B1 8/2005 Anderson et al.
6,957,067 B1 10/2005 Iyer et al.
6,973,622 B1 12/2005 Rappaport et al.
6,978,301 B2 12/2005 Tindal
6,980,533 B1 12/2005 Abraham et al.
6,985,469 B2 1/2006 Leung
6,993,683 B2 1/2006 Bhat et al.
6,996,630 B1 2/2006 Masaki et al.
7,013,157 B1 * 3/2006 Norman et al. ............... 455/503
7,020,438 B2 3/2006 Sinivaara et al.
7,020,773 B1 3/2006 Otway et al.
7,024,199 B1 4/2006 Massie et al.
7,024,394 B1 4/2006 Ashour et al.
7,027,773 B1 4/2006 McMillin
7,031,705 B2 4/2006 Grootwassink
7,035,220 B1 4/2006 Simcoe
7,039,037 B2 5/2006 Wang et al.
7,058,414 B1 6/2006 Rofheart et al.
7,062,566 B2 6/2006 Amara et al.
7,068,999 B2 6/2006 Ballai
7,079,537 B1 7/2006 Kanuri et al.
7,089,322 B1 8/2006 Stallmann
7,092,529 B2 8/2006 Yu et al.
7,110,756 B2 9/2006 Diener
7,116,979 B2 10/2006 Backes et al.
7,126,913 B1 10/2006 Patel et al.
7,134,012 B2 11/2006 Doyle et al.
7,139,829 B2 11/2006 Wenzel et al.
7,142,867 B1 11/2006 Gandhi et al.
7,146,166 B2 12/2006 Backes et al.
7,155,236 B2 12/2006 Chen et al.
7,155,518 B2 12/2006 Forslow et al.
7,158,777 B2 1/2007 Lee et al.
7,159,016 B2 1/2007 Baker
7,221,927 B2 5/2007 Kolar et al.
7,224,970 B2 5/2007 Smith et al.
7,239,862 B1 7/2007 Clare et al.
7,246,243 B2 7/2007 Uchida
7,263,366 B2 8/2007 Miyashita
7,274,730 B2 9/2007 Nakabayashi
7,280,495 B1 * 10/2007 Zweig et al. .................. 370/312
7,290,051 B2 10/2007 Dobric et al.
7,293,136 B1 11/2007 More et al.
7,310,664 B1 12/2007 Merchant et al.
7,317,914 B2 1/2008 Adya et al.
7,320,070 B2 1/2008 Baum
7,324,468 B2 1/2008 Fischer
7,324,487 B2 1/2008 Saito
7,324,489 B1 1/2008 Iyer
7,350,077 B2 3/2008 Meier et al.
7,359,676 B2 4/2008 Hrastar
7,370,362 B2 5/2008 Olson et al.
7,376,080 B1 5/2008 Riddle et al.
7,379,423 B1 5/2008 Caves et al.
7,382,756 B2 6/2008 Barber et al.
7,417,953 B2 8/2008 Hicks et al.
7,421,248 B1 9/2008 Laux et al.
7,421,487 B1 9/2008 Peterson et al.
7,440,416 B2 10/2008 Mahany et al.
7,443,823 B2 10/2008 Hunkeler et al.
7,447,502 B2 11/2008 Buckley
7,451,316 B2 11/2008 Halasz et al.
7,460,855 B2 12/2008 Barkley et al.
7,466,678 B2 12/2008 Cromer et al.
7,475,130 B2 1/2009 Silverman
7,477,894 B1 1/2009 Sinha
7,480,264 B1 1/2009 Duo et al.
7,483,390 B2 1/2009 Rover et al.
7,489,648 B2 2/2009 Griswold
7,493,407 B2 2/2009 Leedom et al.
7,505,434 B1 3/2009 Backes
7,509,096 B2 3/2009 Palm et al.
7,529,925 B2 5/2009 Harkins
7,551,574 B1 6/2009 Peden, II et al.
7,551,619 B2 6/2009 Tiwari
7,558,266 B2 7/2009 Hu
7,570,656 B2 * 8/2009 Raphaeli et al. .............. 370/445
7,573,859 B2 8/2009 Taylor
7,577,453 B2 8/2009 Matta
7,592,906 B1 9/2009 Hanna et al.
7,636,363 B2 12/2009 Chang et al.
7,680,501 B2 3/2010 Sillasto et al.
7,693,526 B2 4/2010 Qian et al.
7,715,432 B2 5/2010 Bennett
7,716,379 B2 5/2010 Ruan et al.
7,724,703 B2 5/2010 Matta et al.
7,724,704 B2 5/2010 Simons et al.
7,729,278 B2 6/2010 Chari et al.
7,733,868 B2 6/2010 Van Zijst
7,746,897 B2 6/2010 Stephenson et al.
7,788,475 B2 8/2010 Zimmer et al.
7,805,529 B2 9/2010 Galluzzo et al.
7,817,554 B2 10/2010 Skog et al.
7,844,298 B2 11/2010 Riley
7,865,713 B2 1/2011 Chesnutt et al.
7,873,061 B2 1/2011 Gast et al.
7,894,852 B2 2/2011 Hansen
7,912,982 B2 3/2011 Murphy
7,929,922 B2 4/2011 Kubo
7,945,399 B2 5/2011 Nosovitsky et al.
7,986,940 B2 7/2011 Lee et al.
2001/0024953 A1 9/2001 Balogh
2002/0021701 A1 2/2002 Lavian et al.
2002/0052205 A1 5/2002 Belostofsky et al.
2002/0060995 A1 5/2002 Cervello et al.

2002/0062384 A1 5/2002 Tso
2002/0069278 A1 6/2002 Forslow
2002/0078361 A1 6/2002 Giroux et al.
2002/0080790 A1 6/2002 Beshai
2002/0087699 A1 7/2002 Karagiannis et al.
2002/0094824 A1 7/2002 Kennedy et al.
2002/0095486 A1 7/2002 Bahl
2002/0101868 A1 8/2002 Clear et al.
2002/0116655 A1 8/2002 Lew et al.
2002/0157020 A1 10/2002 Royer
2002/0174137 A1 11/2002 Wolff et al.
2002/0176437 A1 11/2002 Busch et al.
2002/0191572 A1 12/2002 Weinstein et al.
2002/0194251 A1 12/2002 Richter et al.
2003/0014646 A1 1/2003 Buddhikot et al.
2003/0018889 A1 1/2003 Burnett et al.
2003/0043073 A1 3/2003 Gray et al.
2003/0055959 A1 3/2003 Sato
2003/0107590 A1 6/2003 Levillain et al.
2003/0120764 A1 6/2003 Laye et al.
2003/0133450 A1 7/2003 Baum
2003/0134642 A1 7/2003 Kostic et al.
2003/0135762 A1 7/2003 Macaulay
2003/0156586 A1 8/2003 Lee et al.
2003/0174706 A1 9/2003 Shankar et al.
2003/0193910 A1 10/2003 Shoaib et al.
2003/0204596 A1 10/2003 Yadav
2003/0227934 A1* 12/2003 White et al. .................. 370/432
2004/0002343 A1 1/2004 Brauel et al.
2004/0003285 A1 1/2004 Whelan et al.
2004/0019857 A1 1/2004 Teig et al.
2004/0025044 A1 2/2004 Day
2004/0029580 A1 2/2004 Haverinen et al.
2004/0030777 A1 2/2004 Reedy et al.
2004/0038687 A1 2/2004 Nelson
2004/0044749 A1 3/2004 Harkin
2004/0047320 A1 3/2004 Eglin
2004/0053632 A1 3/2004 Nikkelen et al.
2004/0054569 A1 3/2004 Pombo et al.
2004/0054774 A1 3/2004 Barber et al.
2004/0054926 A1 3/2004 Ocepek et al.
2004/0062267 A1 4/2004 Minami et al.
2004/0064560 A1 4/2004 Zhang et al.
2004/0068668 A1 4/2004 Lor et al.
2004/0078598 A1 4/2004 Barber et al.
2004/0093506 A1 5/2004 Grawrock et al.
2004/0095914 A1 5/2004 Katsube et al.
2004/0095932 A1 5/2004 Astarabadi et al.
2004/0106403 A1 6/2004 Mori et al.
2004/0111640 A1 6/2004 Baum
2004/0114546 A1 6/2004 Seshadri et al.
2004/0119641 A1 6/2004 Rapeli
2004/0120370 A1 6/2004 Lupo
2004/0143428 A1 7/2004 Rappaport et al.
2004/0165545 A1 8/2004 Cook
2004/0174900 A1 9/2004 Volpi et al.
2004/0184475 A1 9/2004 Meier
2004/0208570 A1 10/2004 Reader
2004/0214572 A1 10/2004 Thompson et al.
2004/0221042 A1 11/2004 Meier
2004/0230370 A1 11/2004 Tzamaloukas
2004/0233234 A1 11/2004 Chaudhry et al.
2004/0236702 A1 11/2004 Fink et al.
2004/0246937 A1 12/2004 Duong et al.
2004/0246962 A1 12/2004 Kopeikin et al.
2004/0252656 A1 12/2004 Shiu et al.
2004/0255167 A1 12/2004 Knight
2004/0259542 A1 12/2004 Viitamaki et al.
2004/0259555 A1 12/2004 Rappaport et al.
2004/0259575 A1 12/2004 Perez-Breva et al.
2005/0015592 A1 1/2005 Lin
2005/0021979 A1 1/2005 Wiedmann et al.
2005/0025105 A1 2/2005 Rue
2005/0026611 A1 2/2005 Backes
2005/0030894 A1 2/2005 Stephens
2005/0030929 A1 2/2005 Swier et al.
2005/0037818 A1 2/2005 Seshadri et al.
2005/0040968 A1 2/2005 Damarla et al.
2005/0054326 A1 3/2005 Rogers
2005/0054350 A1 3/2005 Zegelin
2005/0058132 A1 3/2005 Okano et al.
2005/0059405 A1 3/2005 Thomson et al.
2005/0059406 A1 3/2005 Thomson et al.
2005/0064873 A1 3/2005 Karaoguz et al.
2005/0068925 A1 3/2005 Palm et al.
2005/0073980 A1 4/2005 Thomson et al.
2005/0078644 A1 4/2005 Tsai et al.
2005/0097618 A1 5/2005 Arling et al.
2005/0114649 A1 5/2005 Challener et al.
2005/0120125 A1 6/2005 Morten et al.
2005/0122927 A1 6/2005 Wentink
2005/0122977 A1 6/2005 Lieberman
2005/0128142 A1 6/2005 Shin et al.
2005/0128989 A1 6/2005 Bhagwat et al.
2005/0144237 A1 6/2005 Heredia et al.
2005/0154933 A1 7/2005 Hsu et al.
2005/0157730 A1 7/2005 Grant et al.
2005/0159154 A1 7/2005 Goren
2005/0163078 A1 7/2005 Oba et al.
2005/0163146 A1 7/2005 Ota et al.
2005/0175027 A1 8/2005 Miller et al.
2005/0180345 A1 8/2005 Meier
2005/0180358 A1 8/2005 Kolar et al.
2005/0181805 A1 8/2005 Gallagher
2005/0190714 A1 9/2005 Gorbatov et al.
2005/0193103 A1 9/2005 Drabik
2005/0207336 A1 9/2005 Choi et al.
2005/0213519 A1 9/2005 Relan et al.
2005/0220033 A1 10/2005 DelRegno et al.
2005/0223111 A1 10/2005 Bhandaru et al.
2005/0239461 A1 10/2005 Verma et al.
2005/0240665 A1 10/2005 Gu et al.
2005/0243737 A1 11/2005 Dooley et al.
2005/0245258 A1 11/2005 Classon et al.
2005/0245269 A1 11/2005 Demirhan et al.
2005/0259597 A1 11/2005 Benedetotto et al.
2005/0259611 A1 11/2005 Bhagwat et al.
2005/0270992 A1 12/2005 Sanzgiri et al.
2005/0273442 A1 12/2005 Bennett et al.
2005/0276218 A1 12/2005 Ooghe et al.
2005/0286466 A1 12/2005 Tagg et al.
2006/0030290 A1 2/2006 Rudolf et al.
2006/0035662 A1 2/2006 Jeong et al.
2006/0039395 A1 2/2006 Perez-Costa et al.
2006/0041683 A1 2/2006 Subramanian et al.
2006/0045050 A1 3/2006 Floros et al.
2006/0046744 A1 3/2006 Dublish et al.
2006/0050742 A1 3/2006 Grandhi et al.
2006/0073847 A1 4/2006 Pirzada et al.
2006/0094440 A1 5/2006 Meier et al.
2006/0098607 A1 5/2006 Zeng et al.
2006/0104224 A1 5/2006 Singh et al.
2006/0114872 A1 6/2006 Hamada
2006/0117174 A1 6/2006 Lee
2006/0128415 A1 6/2006 Horikoshi et al.
2006/0143496 A1 6/2006 Silverman
2006/0152344 A1 7/2006 Mowery
2006/0160540 A1 7/2006 Strutt et al.
2006/0161983 A1 7/2006 Cothrell et al.
2006/0165103 A1 7/2006 Trudeau et al.
2006/0168383 A1 7/2006 Lin
2006/0174336 A1 8/2006 Chen
2006/0178168 A1 8/2006 Roach
2006/0182118 A1 8/2006 Lam et al.
2006/0189311 A1 8/2006 Cromer et al.
2006/0193258 A1 8/2006 Ballai
2006/0200862 A1 9/2006 Olson et al.
2006/0206582 A1 9/2006 Finn
2006/0215601 A1 9/2006 Vieugels et al.
2006/0217131 A1 9/2006 Alizadeh-Shabdiz et al.
2006/0245393 A1 11/2006 Bajic
2006/0248229 A1 11/2006 Saunderson et al.
2006/0248331 A1 11/2006 Harkins
2006/0274774 A1 12/2006 Srinivasan et al.
2006/0276192 A1 12/2006 Dutta et al.
2006/0285489 A1 12/2006 Francisco et al.
2006/0292992 A1 12/2006 Tajima et al.
2007/0002833 A1 1/2007 Bajic 2007/0008884 A1 1/2007 Tang
2007/0011318 A1 1/2007 Roth
2007/0025265 A1 2/2007 Porras et al.
2007/0025306 A1 2/2007 Cox et al.
2007/0027964 A1 2/2007 Herrod et al.
2007/0054616 A1 3/2007 Culbert
2007/0058598 A1 3/2007 Ling
2007/0064673 A1 3/2007 Bhandaru et al.
2007/0064718 A1* 3/2007 Ekl et al. ........................ 370/432
2007/0067823 A1 3/2007 Shim et al.
2007/0070937 A1 3/2007 Demirhan et al.
2007/0076694 A1 4/2007 Iyer et al.
2007/0083924 A1 4/2007 Lu
2007/0086378 A1 4/2007 Matta et al.
2007/0086397 A1 4/2007 Taylor
2007/0086398 A1 4/2007 Tiwari
2007/0091845 A1 4/2007 Brideglall
2007/0091889 A1* 4/2007 Xiao et al. .................... 370/390
2007/0098086 A1 5/2007 Bhaskaran
2007/0104197 A1 5/2007 King
2007/0115842 A1 5/2007 Matsuda et al.
2007/0133494 A1 6/2007 Lai et al.
2007/0135866 A1 6/2007 Baker et al.
2007/0136372 A1 6/2007 Proctor et al.
2007/0171909 A1 7/2007 Pignatelli
2007/0183375 A1 8/2007 Tiwari
2007/0189222 A1 8/2007 Kolar et al.
2007/0195793 A1 8/2007 Grosser et al.
2007/0230457 A1 10/2007 Kodera et al.
2007/0248009 A1 10/2007 Petersen
2007/0253380 A1 11/2007 Jollota et al.
2007/0255116 A1 11/2007 Mehta et al.
2007/0258448 A1 11/2007 Hu
2007/0260720 A1 11/2007 Morain
2007/0268506 A1 11/2007 Zeldin
2007/0268514 A1 11/2007 Zeldin et al.
2007/0268515 A1 11/2007 Freund et al.
2007/0268516 A1 11/2007 Bugwadia et al.
2007/0286208 A1 12/2007 Kanada et al.
2007/0287390 A1 12/2007 Murphy et al.
2007/0291689 A1 12/2007 Kapur et al.
2007/0297329 A1 12/2007 Park et al.
2008/0002588 A1 1/2008 McCaughan et al.
2008/0008117 A1 1/2008 Alizadeh-Shabdiz
2008/0013481 A1 1/2008 Simons et al.
2008/0014916 A1 1/2008 Chen
2008/0031257 A1 2/2008 He
2008/0056200 A1 3/2008 Johnson
2008/0056211 A1 3/2008 Kim et al.
2008/0064356 A1 3/2008 Khayrallah
2008/0069018 A1 3/2008 Gast
2008/0080441 A1 4/2008 Park et al.
2008/0096575 A1 4/2008 Aragon et al.
2008/0102815 A1 5/2008 Sengupta et al.
2008/0107077 A1 5/2008 Murphy
2008/0114784 A1 5/2008 Murphy
2008/0117822 A1 5/2008 Murphy et al.
2008/0151844 A1 6/2008 Tiwari
2008/0159319 A1 7/2008 Gast et al.
2008/0162921 A1 7/2008 Chesnutt et al.
2008/0220772 A1 9/2008 Islam et al.
2008/0226075 A1 9/2008 Gast
2008/0228942 A1 9/2008 Lor et al.
2008/0250496 A1 10/2008 Namihira
2008/0261615 A1 10/2008 Kalhan
2008/0276303 A1 11/2008 Gast
2009/0031044 A1 1/2009 Barrack et al.
2009/0046688 A1 2/2009 Volpi et al.
2009/0059930 A1 3/2009 Ryan et al.
2009/0067436 A1 3/2009 Gast
2009/0073905 A1 3/2009 Gast
2009/0131082 A1 5/2009 Gast
2009/0198999 A1 8/2009 Harkins
2009/0247103 A1 10/2009 Aragon
2009/0257437 A1 10/2009 Taylor
2009/0260083 A1 10/2009 Szeto et al.
2009/0274060 A1 11/2009 Taylor
2009/0287816 A1 11/2009 Matta et al.
2009/0293106 A1 11/2009 Peden, II et al.
2010/0002610 A1 1/2010 Bowser et al.
2010/0024007 A1 1/2010 Gast
2010/0040059 A1 2/2010 Hu
2010/0067379 A1 3/2010 Zhao et al.
2010/0172276 A1 7/2010 Aragon
2010/0180016 A1 7/2010 Bugwadia et al.
2010/0195549 A1 8/2010 Aragon et al.
2010/0261475 A1 10/2010 Kim et al.
2010/0329177 A1 12/2010 Murphy et al.
2011/0128858 A1 6/2011 Matta et al.
2011/0158122 A1 6/2011 Murphy et al.

FOREIGN PATENT DOCUMENTS

GB 2 329 801 A 3/1999
GB 2429080 A 2/2007
JP 2000-215169 A1 8/2000
JP 2003-234751 A1 8/2003
JP 2003274454 9/2003
JP 2004-032525 A1 1/2004
WO WO94/03986 2/1994
WO WO-9403986 2/1994
WO WO99/11003 3/1999
WO WO-9911003 3/1999
WO WO 00/06271 A1 2/2000
WO WO 00/18148 3/2000
WO WO 02/089442 A1 11/2002
WO WO 03/085544 A1 10/2003
WO WO-03085544 10/2003
WO WO 2004/013986 A1 2/2004
WO WO 2004/095192 A2 11/2004
WO WO 2004/095800 A1 11/2004
WO WO-2004095192 11/2004
WO WO-2004095800 11/2004

OTHER PUBLICATIONS

Information Sciences Institute, RFC-791—Internet Protocol, DARPA, Sep. 1981.*
U.S. Appl. No. 11/487,722, filed Jul. 2006, Simons et al.
U.S. Appl. No. 11/592,891, filed Nov. 2006, James Murphy.
U.S. Appl. No. 11/595,119, filed Nov. 2006, James Murphy.
U.S. Appl. No. 11/604,075, filed Nov. 2006, Murphy et al.
U.S. Appl. No. 11/643,329, filed Dec. 2006, Manish Towari.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Mathew S. Gast.
U.S. Appl. No. 11/852,234, filed Sep. 2007, Gast et al.
U.S. Appl. No. 11/944,346, filed Nov. 2007, Mathew S. Gast.
U.S. Appl. No. 11/966,912, filed Dec. 2007, Chesnutt et al.
U.S. Appl. No. 11/970,484, filed Jan. 2008, Mathew S. Gast.
U.S. Appl. No. 11/975,134, filed Oct. 2007, Aragon et al.
U.S. Appl. No. 12/077,051, filed Mar. 2008, Mathew S. Gast.
Puttini, R., Percher, J., Me, L., and de Sousa, R. 2004. A fully distributed IDS for MANET. In *Proceedings of the Ninth international Symposium on Computers and Communications 2004 vol. 2* (*Iscc"04*)—vol. 2 (Jun. 28-Jul. 1, 2004). ISCC. IEEE Computer Society, Washington, DC, 331-338.
U.S. Appl.No. 11/326,966, filed Jan. 5, 2006, Taylor.
U.S. Appl. No. 11/331,789, filed Jan. 14, 2006, Matta, et al.
U.S. Appl. No. 11/351,104, filed Feb. 8, 2006, Tiwari.
U.S. Appl. No. 11/377,859, filed Mar 15, 2006, Harkins.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19,2006, Zeldin.
U.S. Appl. No. 11/437,387, filed May 19, 2006, Zeldin et al.
U.S. Appl. No. 11,437,582, filed May 19, 2006, Bugwadia et al.
U.S. Appl. No. 11/451,704, filed Jun. 12, 2006, Riley.
Acampora and Winters, IEEE Journal on selected Areas in Communications. *SAC-5*:796-804 (1987).
Freret et al., Applications of Spread-Spectrum Radio to Wireless Terminal Communications, Conf. Record, Nat'l Telecom. Conf., Nov. 30-Dec. 4, 1980.

Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the $13^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
Co-pending U.S. Appl. No. 10/778,901, filed Feb. 13, 2004.
Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,473, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/131,028, filed May 3, 2008.
Co-pending U.S. Appl. No. 12/336,492, filed Dec. 16, 2008.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Puttini, R., Percher, J., Me, L., and de Sousa, R. 2004. A fully distributed IDS for Manet. In Proceedings of the Ninth international Symposium on computers and communications 2004 vol. 2 (Iscc"04)—vol. 02 (Jun. 28-Jul. 1, 2004). ISCC. IEEE Computer Society, Washington, DC, 331-338.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.
Notice of Allowance Mailed Mar. 19, 2010, in Co-pending U.S. Appl. No. 11/487,722, filed Jul. 17, 2006.
Acampa and Winters, IEEE Journal on selected Areas in Communications. SAC-5:796-804 (1987).
Acampora and Winters, IEEE Communications Magazine, 25(8):11-20 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Fortune et al., IEEE Computational Science and Engineering, "Wise Design of Indoor Wireless Systems: Practical Computation and Optimization", p. 58-68 (1995).
Freret et al., Applications of Spread-Spectrum Radio to Wireless Terminal Communications, Conf. Record. Nat'l Telecom. Conf., Nov. 30-Dec. 4, 1980.
Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propogation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Users", (1977).
LAN/MAN Standards Committee of the IEEE Computer Society, Part 11:Wireless LAN Medium Access Control (MAC) and Physical Layer (PHY) Specifications: Higher Speed Physical Layer Extension in the 2.4 GHz Band, IEEE Std. 801.11b (1999).
Okamoto and Xu, IEEE, Proceedings of the 13th Annual Hawaii International Conference on System Sciences, pp. 54-63 (1997).
Panjawani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Puttini, R., Percher, J., Me, L., and De Sousa, R. 2004. A fully distributed IDS for MANET. In *Proceedings of the Ninth international Symposium on Computers and Communications 2004 vol. 2 (Iscc"04)*—vol. 02 (Jun. 28-Jul. 1, 2004). ISCC. IEEE Computer Society. Washington, DC. 331-338.
Seidel et al, "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus", IEEE ICUPC '96 Proceedings (1996).
Ullmo et al., "Wireless Propogation in Buildings: A Statistic Scattering Approach", IEEE Transactions on Vehicular Technology, vol. 48, No. 3, May 1999.
Co-pending U.S. Appl. No. 12/401,073, filed Mar. 10, 2009.
Co-pending U.S. Appl. No. 12/489,295, filed Jun. 22, 2009.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
P. Bahl et al., RADAR: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters , vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 12/763,057, filed Apr. 19, 2010.
U.S. Appl. No. 13/006,950, filed Jan. 14, 2011.
U.S. Appl. No. 09/866,474, filed May 29, 2001.
U.S. Appl. No. 13/017,801, filed Jan. 31, 2011.
Final Office Action for U.S. Appl. No. 11/784,307, mailed Jun. 14, 2010.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 12/500,392, mailed Jun. 20, 2011.
Office Action for U.S. Appl. No. 12/489,295, mailed Apr. 27, 2011.
Office Action for U.S. Appl. No. 11/351,104, mailed Oct. 28, 2008.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 12/785,362, mailed Apr. 22, 2011.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.

Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S.Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X , mailed Dec. 31, 2010.
International Search Report and Written Opinion for PCT/US07/013757, mailed Jan. 22, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.

* cited by examiner

SYSTEM AND METHOD FOR RELIABLE MULTICAST

CROSS REFERENCE TO RELATED APPLICATIONS

This Application claims the benefit of U.S. Provisional Application No. 60/727,025 filed on Oct. 13, 2005, which is incorporated by reference.

BACKGROUND

Between two wireless beacons, you could send a unicast packet, and receive an acknowledgement that follows every unicast packet. For multicast packets, there is typically no acknowledgement. In wired networks, this may not be a serious concern. However, if a wireless packet gets lost on air due to, by way of example but not limitation, collisions or interference, data is lost. Moreover, it would not be known whether retrying transmissions of multicast packets would be beneficial since there is no acknowledgement. So, multicast transmission typically does not include retrying transmission of multicast packets.

Although multicast traffic is efficient—since multicast packets require no acknowledgement from recipients, and no retry—wireless multicast data can be unreliable. This renders problematic the execution of certain applications that need relatively reliable data, such as, by way of example but not limitation, multicast video and multicast audio. Indeed, in dense deployments, multicast video applications are practically unusable.

Some ways to improve wireless multicast reliability require that multicast transmissions are essentially—or actually—turned into multiple unicast transmissions. For example, a system could require acknowledgement from all multicast packet recipients. As another example, a multicast packet could be converted into multiple unicast packets. These remedies may improve reliability, but would likely increase overhead and decrease efficiency. Multicast to unicast conversion is known to be costly. Acknowledgement solutions achieved with token passing or randomization are complex and, particularly in the case of randomization, unpredictable.

Another possible way to improve wireless multicast reliability is with media reservation schemes. Media reservation may be across full transmission time, i.e., Clear to Send (CTS) to self reserving for the full transmission time, but this does not solve for loss while packets are transmitted. Media reservation for every packet, i.e., CTS to self for every packet, is inefficient. Application layer solutions, on the other hand, have been implemented but solve the problem on the wrong layer. It would be desirable to provide wireless multicast functionality that is more efficient than that of these prior art systems, and more reliable than that of a system in which no acknowledgements are required.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for reliable multicast involves identifying a client as an acknowledger of a wireless multicast packet, and having the acknowledger acknowledge receipt of the multicast packet. An example of a method according to the technique may include receiving a multicast packet, selecting a client associated with a destination of the multicast packet, identifying the client in the multicast packet, forwarding the multicast packet to wireless, and retrying forwarding the multicast packet with the client identified in the multicast packet if no acknowledgement is received from the client identified in the multicast packet. The client may be identified by, for example, putting the client's associated medium access control (MAC) address in the header of the multicast packet.

An example of a system according to the technique may include a means for identifying a client, a means for putting the client MAC address in the header of a multicast packet, a means for sending the multicast packet with the client MAC address to a wireless multicast destination, and a means for receiving acknowledgement from the client associated with the client MAC address. The system may further include, for example, a means for receiving the multicast packet and a means for selecting the client from one or more clients that are in a multicast destination associated with the multicast packet.

Another example of a system according to the technique may include a client MAC determination module for determining a MAC address associated with a client device, a multicast packet acknowledgement module for placing the MAC address in a header of a multicast packet with a multicast destination that includes the client device and receiving acknowledgement that the multicast packet was received at the client device, an 802.11 MAC module, and a processor for executing the client MAC determination module and the 802.11 MAC module.

The proposed system can offer, among other advantages, improved reliability of wireless multicast transmissions. This can be accomplished in a wireless network that is relatively efficient compared to a wireless network that has multicast effectively disabled. Advantageously, the proposed system can be implemented without changing the current standard. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
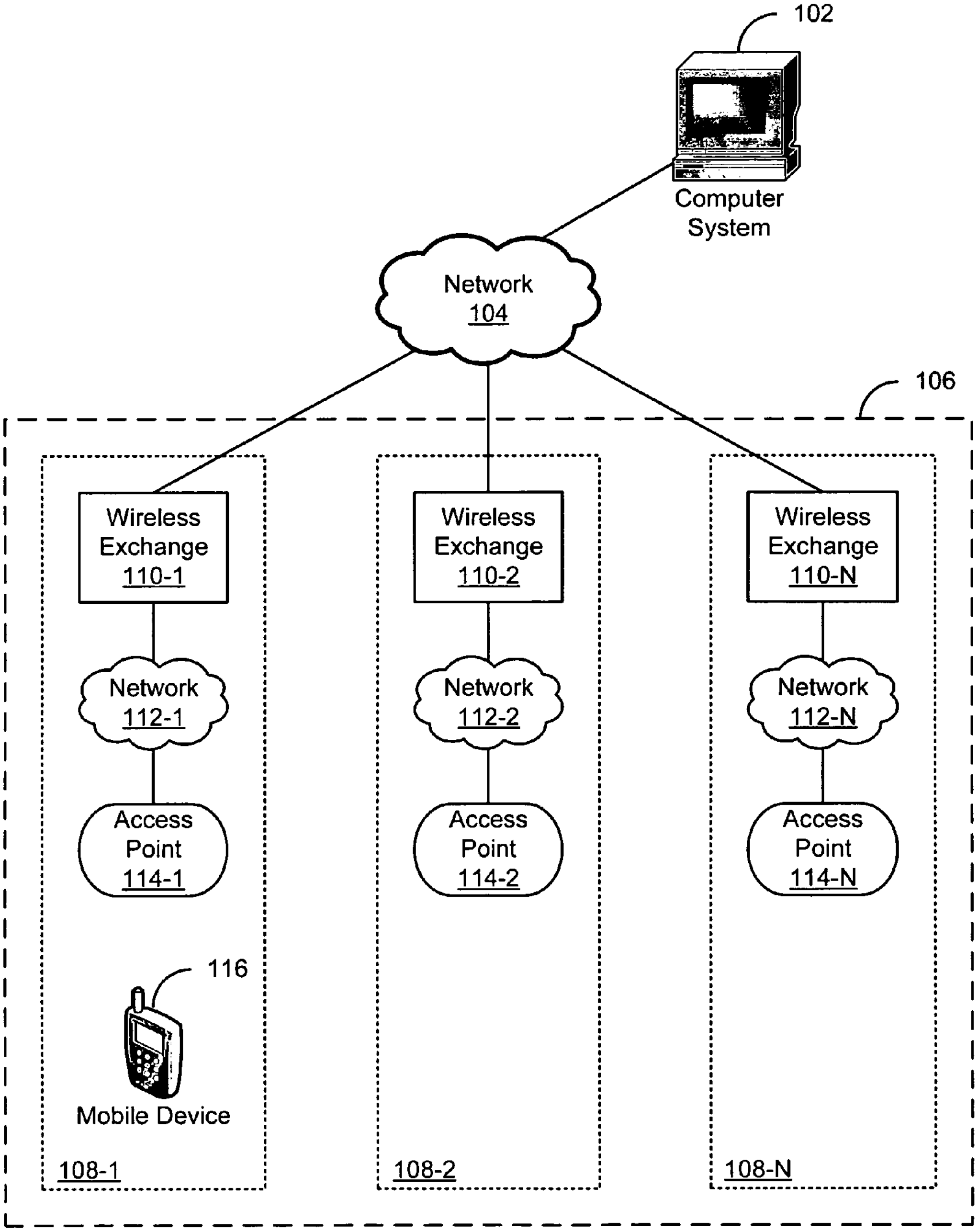
FIG. 1 depicts a system including a wireless access domain.

FIG. 1 depicts a system 100 including a wireless access domain. The system 100 includes a computer system 102, a network 104, and a wireless access domain 106. The system 100 may or may not include multiple wireless access domains. The computer system 102 may be practically any type of device that is capable of communicating with a communications network, such as, by way of example but not limitation, a workstation. The network 104 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 102 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 104 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 102 and the wireless access domain 106 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 106 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 106 may be referred to as, by way of example but not limitation, a Local Area Network (LAN), virtual LAN (VLAN), and/or wireless LAN (WLAN). The wireless access domain 106 gives each user a persistent identity that can be tracked and managed, no matter where they roam. The wireless access domain 106 may have one or more associated snoop filters, which are described later with reference to FIG. 3. In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a TRAPEZE NETWORKS® "identity-aware" MOBILITY DOMAIN® system.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114).

In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a TRAPEZE NETWORKS® MOBILITY EXCHANGE® (MX®) switch. The TRAPEZE NETWORKS® MOBILITY EXCHANGE® switches may, in another implementation, be coordinated by means of the TRAPEZE ACCESS POINT ACCESS™ (TAPA™) protocol.

In an embodiment, the networks 112 are simply wired connections from the wireless exchange switches 110 to the access points 114. The networks 112 may or may not be part of a larger network. In a non-limiting embodiment, the networks 112 provides a Layer 2 path for Layer 3 traffic, preserving IP addresses, sessions, and other wired Layer 3 attributes as users roam throughout the wireless access domain 106. Advantageously, by tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile 802.11 stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a TRAPEZE NETWORKS® MOBILITY SYSTEM® MOBILITY POINT® (MP®) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, the wireless client 116 may be implemented as a station. In alternative embodiments, a station may comply with a different standard than IEEE 802.11, and may have different interfaces to a wireless or other medium.

In operation, a wireless client 116 can roam from one of the access areas 108 to another of the access areas 108. For example, in the example of FIG. 1 the wireless client 116 moves from the access area 108-1 to the access area 108-N. In an embodiment, the wireless client 116 can maintain a single IP address and associated data sessions. The ability of the wireless client 116 to roam across the access areas 108 while maintaining a single IP address and associated data sessions may be referred to as subnet mobility. Advantageously, the system 100 may be implemented using identity-based networking, which is a technique that enforces network authorization attributes to the wireless client 116 based on client identity rather than the port or device through which the wireless client 116 connects to the network. This technique enables both a single persistent login and passport free roaming which permits the introduction of services such as voice to a wireless LAN.

Figure 2:
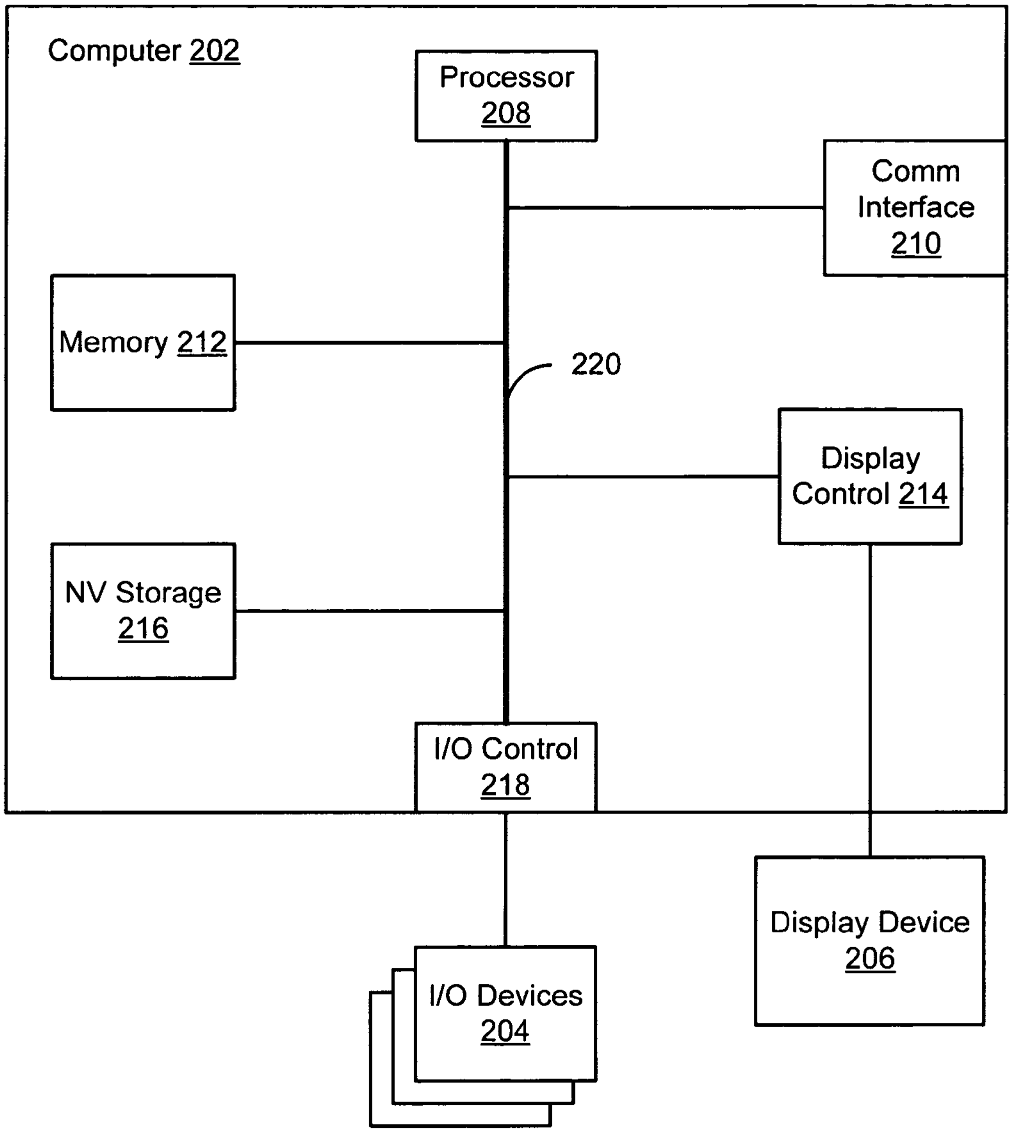
FIG. 2 depicts a computer system for use in the system of FIG. 1.

FIG. 2 depicts a computer system 200 for use in the system 100 (FIG. 1). The computer system 200 may be a conventional computer system that can be used as a client computer system, such as a wireless client or a workstation, or a server computer system. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. It will be appreciated that the communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems.

The processor 208 may be, for example, a conventional microprocessor such as an Intel Pentium microprocessor or Motorola power PC microprocessor. The memory 212 is coupled to the processor 208 by a bus 220. The memory 212 can be Dynamic Random Access Memory (DRAM) and can also include Static RAM (SRAM). The bus 220 couples the processor 208 to the memory 212, also to the non-volatile storage 216, to the display controller 214, and to the I/O controller 218.

The I/O devices 204 can include a keyboard, disk drives, printers, a scanner, and other input and output devices, including a mouse or other pointing device. The display controller 214 may control in the conventional manner a display on the display device 206, which can be, for example, a cathode ray tube (CRT) or liquid crystal display (LCD). The display controller 214 and the I/O controller 218 can be implemented with conventional well known technology.

The non-volatile storage 216 is often a magnetic hard disk, an optical disk, or another form of storage for large amounts of data. Some of this data is often written, by a direct memory access process, into memory 212 during execution of software in the computer 202. One of skill in the art will immediately recognize that the terms "machine-readable medium" or "computer-readable medium" includes any type of storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

In addition, the computer system 200 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 216 and causes the processor 208 to execute the various acts required by the operating system to input and output data and to store data in memory, including storing files on the non-volatile storage 216.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 3:
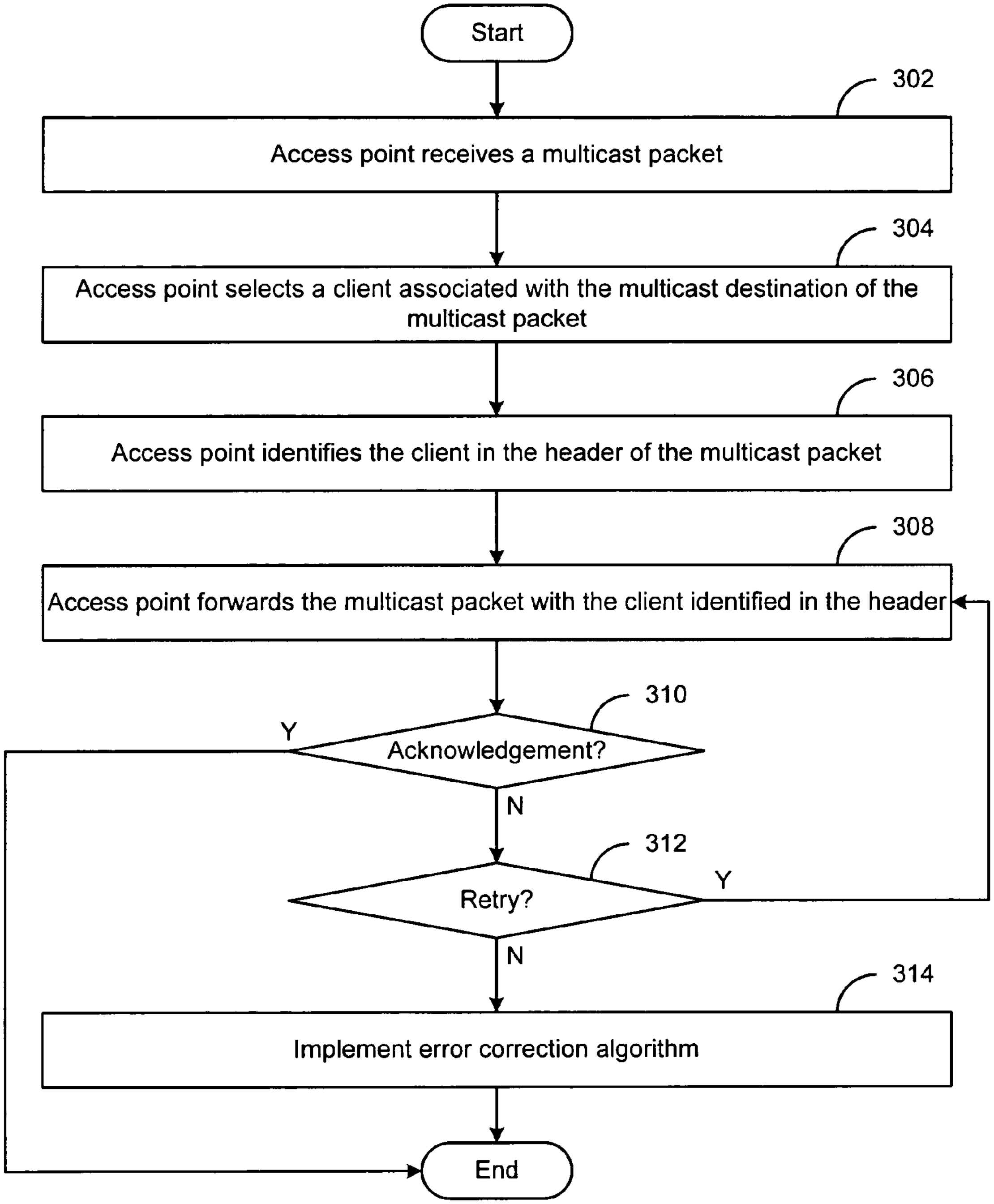
FIG. 3 depicts a flowchart of a method for reliable multicast in a wireless network.

FIG. 3 depicts a flowchart 300 of a method for reliable multicast in a wireless network. This method and other methods are depicted as serially arranged modules. However, modules of the methods may be reordered, or arranged for parallel execution as appropriate. FIG. 3 is intended to illustrate reliable multicast using the techniques described herein, such as adding an acknowledgement address to the header of a multicast packet. In a non-limiting embodiment, each of the modules may be carried out at an Access Point (AP). In alternative embodiments, one or more of the modules may be carried out remotely with respect to the AP.

In the example of FIG. 3, the flowchart 300 starts at module 302 with receiving a multicast packet. In a non-limiting embodiment, the multicast packet is 802.11-compatible. 802.11-compatible is intended to mean the multicast packet can be sent in accordance with, by way of example but not limitation, 802.11a, 802.11b, 802.11g, or other current or future 802.11 standards. It is to be understood that other wireless implementations other than 802.11 will likely have problems that can be reduced using the techniques described herein.

In the example of FIG. 3, the flowchart 300 continues at module 304 with selecting a client associated with the multicast destination of the multicast packet. The selection of the client may be by a number of algorithms or techniques that are described later with reference to FIG. 4. In a non-limiting embodiment, the selected client is intended to acknowledge receipt of the multicast packet.

In the example of FIG. 3, the flowchart 300 continues at module 306 with identifying the client in the header of the multicast packet. The header of an 802.11-compatible multicast packet sent from AP to client includes a Destination Address (DA), a Source Address (SA), a Basic Service Set IDentifier (BSSID), and other fields. The DA may be all 1's or some other multicast address. The SA is the AP's MAC address and the BSSID is the AP's MAC address. At module 306, an additional value is added to the header of the multicast packet. The additional value, in the example of FIG. 3, is a client MAC address. In a non-limiting embodiment, the client MAC address identifies the client that will acknowledge the multicast packet. Advantageously, since a specific client is identified, well-known unicast reliability algorithms can be used to improve reliability at the client.

The additional value is not currently envisioned in the 802.11 standard, but there is sufficient unused space in the header of a multicast packet that the additional value can be added without becoming incompatible with respect to the 802.11 standard. The ability to decode the additional value may or may not require appropriately designed or configured chip sets that are 802.11 compliant.

In the example of FIG. 3, the flowchart 300 continues at module 308 with forwarding the multicast packet with the client identified in the header. The multicast packet is forwarded to the client, which is only a first client of one or more clients that are intended recipients of the multicast packet. A second client (not identified in the header of the multicast packet) that receives the same multicast packet as the first client will not acknowledge receipt of the multicast packet. Advantageously, since potentially fewer acknowledgements are sent, the system may have less traffic and improved efficiency. Assuming the first client was intelligently selected, the system can, in addition, retain good reliability.

In the example of FIG. 3, the flowchart 300 continues at decision point 310 where it is determined whether an acknowledgement has been received. The first client, which is identified in the header of the multicast packet, should send acknowledgement of the multicast packet in much the same manner as a unicast packet recipient would send acknowledgement. The system may or may not wait for a predetermined period of time, to ensure that the acknowledgement is not simply late, before determining that acknowledgement has not been received. If acknowledgement is received (310-Y), then the multicast packet is presumed to have arrived at its multicast destination and flowchart 300 ends.

In the example of FIG. 3, if at decision point 310 it is determined that acknowledgement has not been received (310-N), then the flowchart 300 continues at decision point 312 where it is determined whether a retry is desired. If a retry is desired (312-Y), then the flowchart 300 continues at module 308 and continues as described previously. In an alternative embodiment, the flowchart 300 could instead continue at module 304, where a new client could be selected. The determination as to whether a retry is desirable may be implemented in a number of ways.

One example of a retry decision-making technique is the maintenance of a counter. A retry threshold may be set that indicates the maximum number of times to retry before implementation of an error correction algorithm. If a retry has been attempted fewer than the threshold number, then a retry is attempted again. If not, a retry is not attempted. As another example, retransmission could be at a different data rate than before, in case the client has trouble receiving the multicast packet at a prior data rate. Retry algorithms are a well-studied area of wireless transmission technology, and any current or future algorithms could be implemented to achieve desired retry decision-making and effectiveness.

In the example of FIG. 3, if at decision point 312 it is determined that a retry is not desired (312-N), then the flowchart 300 ends at module 314 with implementing an error correction algorithm. It should be noted that the decision points 310, 312 could be considered a part of an error correction algorithm, either logically or in actual implementation. In any case, a number of error correction algorithms for either multicast or unicast error correction could be implemented by one of skill in the relevant art. For this reason, error correction algorithms are not described in any detail herein.

Figure 4:
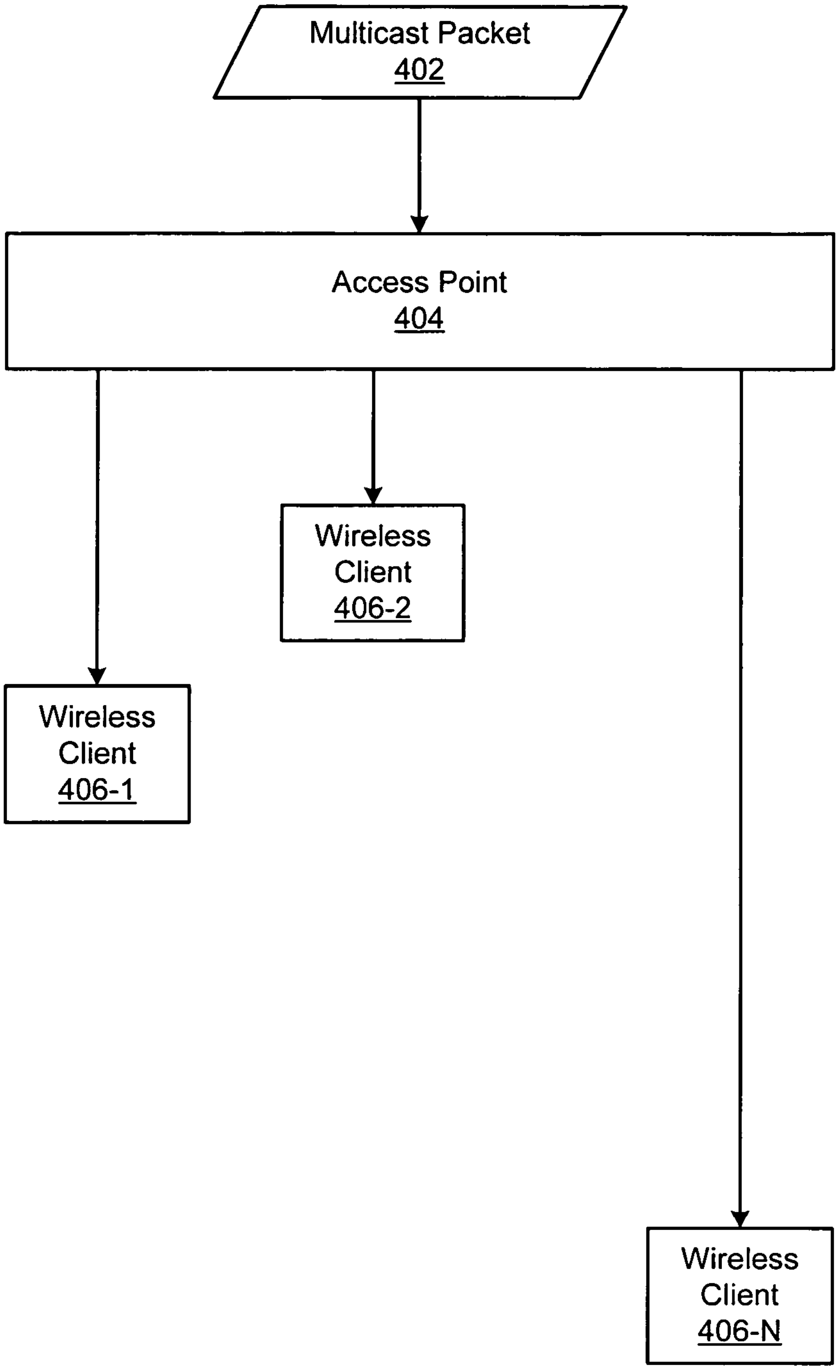
FIG. 4 depicts a conceptual diagram of a wireless network.

FIG. 4 depicts a conceptual diagram 400 of a wireless network. The conceptual diagram 400 includes a multicast packet 402, an access point 404, and wireless clients 406-1 to 406-N (hereinafter collectively referred to as wireless clients 406). The conceptual diagram 400 is intended to serve as an illustration while describing how to select a client acknowledger from among the wireless clients 406.

The access point 404 may wish to determine what client MAC to place in the header of the multicast packet 402. In a first embodiment, the determination may be accomplished by comparing the Received Signal Strength Indicator (RSSI) of the wireless clients 406 and choosing the weakest. This may be desirable because it may be decided that if the weakest RSSI can reliably receive a multicast packet, then the stronger RSSI should also be able to reliably receive a multicast packet. The determination and storage of RSSI values is known to those of skill in the relevant art, and is not described in further detail herein. In the example of FIG. 4, wireless client 406-N is the farthest from the access point 404. In general, the farther a wireless client is from an access point, the weaker its RSSI. For the purposes of this example, it is assumed that the wireless client 406-N, since it is the farthest from the access point 404, has the weakest RSSI. Accordingly, the access point 404 may place the MAC address of the wireless client 406-N in the header of the multicast packet 402, and forward the multicast packet 402 on to each of the wireless clients 406.

In a second embodiment, the determination may be accomplished by comparing the RSSI of the wireless clients 406 and choosing the strongest. In the example of FIG. 4, wireless client 406-2 is the nearest to the access point 404. In general, the closer a wireless client is to an access point, the stronger its RSSI. For the purposes of this example, it is assumed that the wireless client 406-2, since it is the closest to the access point 404, has the strongest RSSI. Accordingly, the access point 404 may place the MAC address of the wireless client 406-2 in the header of the multicast packet 402, and forward the multicast packet 402 on to each of the wireless clients 406.

In a third embodiment, the determination may be accomplished by comparing the RSSI of the wireless clients 406 and choosing the average. In the example of FIG. 4, wireless client 406-1 is presumed to have the closest to average RSSI of the wireless clients 406. Accordingly, the access point 404 may place the MAC address of the wireless client 406-1 in the header of the multicast packet 402, and forward the multicast packet 402 on to each of the wireless clients 406. It should be noted that some other value other than average could be used instead (such as mean, a weighted average that favors a wireless client that is farther or closer than average, or some other algorithm that favors a wireless client that is somewhere between farthest or nearest to the access point 404).

In a fourth embodiment, the determination may be accomplished by picking a client using a customized algorithm. For example, the algorithm may be defined to meet the specific needs of an enterprise. As another example, a wireless network may have certain clients that preferentially act as acknowledgers of receipt of multicast packets. As another example, the algorithm could rely upon deep packet investigation of packets from the wireless clients 406. Specifically, if an Address Resolution Protocol (ARP) is detected, the system could use data within the ARP packet to decide which client to use as an acknowledger of the multicast packet. (ARP is a protocol for mapping an IP address to a physical machine address that is recognized in the local network, as is known to those of skill in the relevant art.) In any case, the client selected could be the first one detected, the most recent one detected, or some other client.

In certain implementations, the system may know more or less about wireless clients or VLANs than in other implementations. For example, VLAN tags may be used to provide additional information about a multicast packet destination in a system that includes intelligent multicasting.

Figure 5:
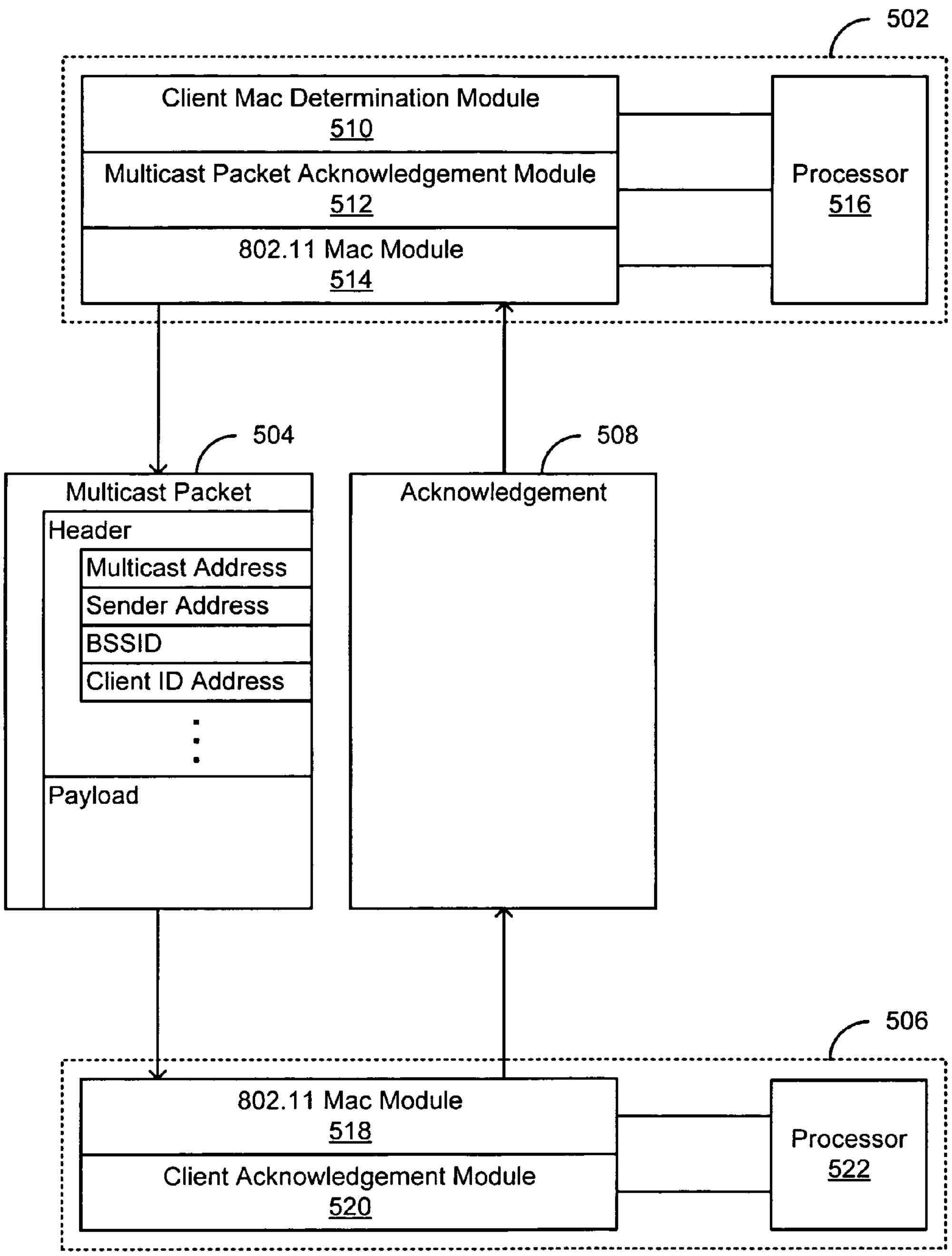
FIG. 5 depicts a system that includes multicast packet acknowledgement.

FIG. 5 depicts a system 500 that includes multicast packet acknowledgement. The system 500 includes an access point 502, a multicast packet 504, a wireless client 506, and an acknowledgement 508. It may be noted that the multicast packet 504 and acknowledgement 508 are transient and may not exist at a given time. The access point 502 and wireless client 506, on the other hand, comprise hardware, software, or both hardware and software components.

The access point 502 includes a client MAC determination module 510, a multicast packet acknowledgement module 512, an 802.11 MAC module 514, and a processor 516. The client MAC determination module 510, as its name suggests, determines a client MAC address that is associated with the wireless client 506. The wireless client 506 may be one of a plurality of wireless clients that are intended recipients of the multicast packet 504. The way in which the client MAC address may be determined has been previously described.

The multicast packet acknowledgement module 512 waits for the acknowledgement 508. If acknowledgement is not received, the multicast packet acknowledgement module 512 may execute retry algorithms or error correction algorithms, as has been previously described. It may be noted that the retry algorithms and error correction algorithms may be executed at a location that is remote relative to the access point 502 in alternative embodiments.

The 802.11 MAC module 514 is a module that allows for use of the 802.11 standards. The module may include timing synchronization procedures and any other necessary components for facilitating the sending and receipt of 802.11-compatible packets.

The multicast packet 504 includes a header and payload. The header includes several fields, including the client ID address field. The client ID address field includes the MAC address of the wireless client 506. It may be noted that multicast packets sent to clients other than the client 506 (not shown) may include in the client ID address field the MAC address of the wireless client 506. That is because, for illustrative purposes, the wireless client 506 is the selected acknowledger of the multicast packet 504.

The wireless client 506 includes an 802.11 MAC module 518, a client acknowledgement module 520, and a processor 522 for executing the modules 518, 520. The 802.11 MAC module 518 is similar to the 802.11 MAC module 514, but is located on the client. The modules 514, 518 may be identical, may be initially identical but configured differently, or significantly different. The client acknowledgement module 520 is for reading the client ID address, determining whether the client ID address is the same as that of the wireless client 506, and generating an acknowledgement if it is determined that the client ID address is the same as that of the wireless client.

The acknowledgement 508 is sent from the wireless client 506 to the access point 502. In an embodiment, the acknowledgement 508 is a packet. Upon receipt, the access point 502 recognizes that the multicast packet was received, obviating the need for retry attempts or error correction.

Figure 6:
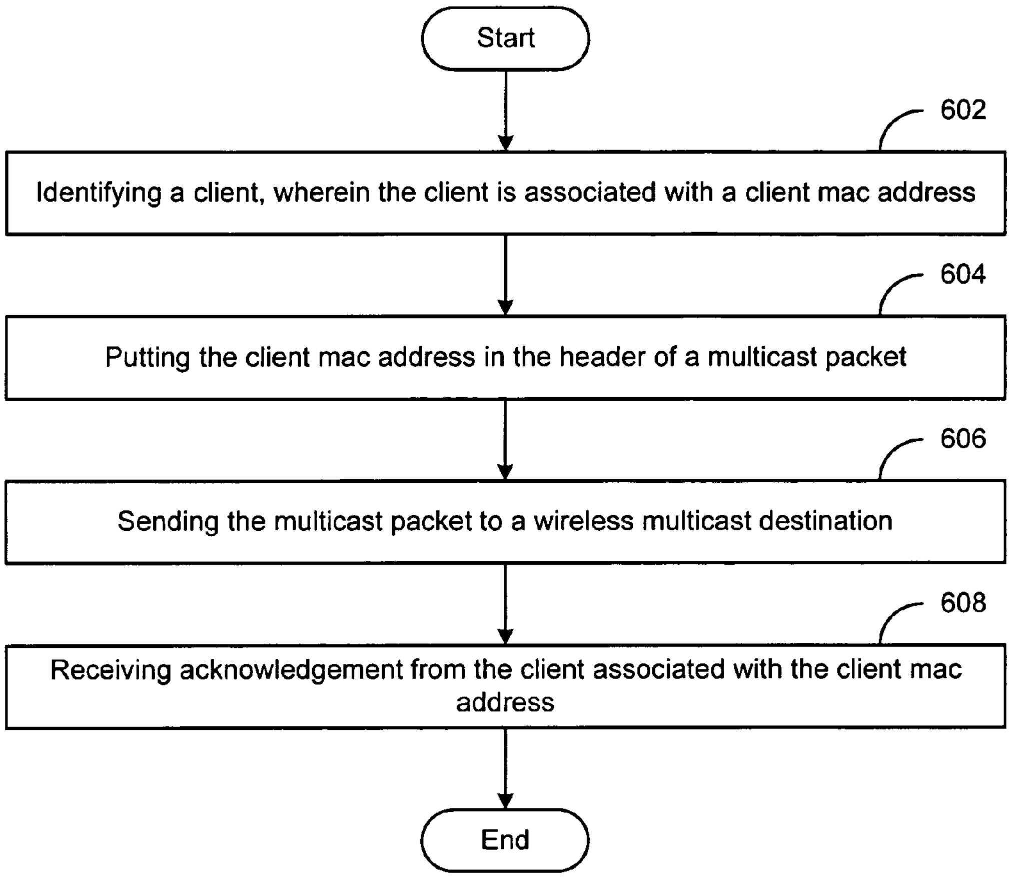
FIG. 6 depicts a flowchart of a method for reliable multicast.

FIG. 6 depicts a flowchart 600 of a method for reliable multicast. FIG. 6 is intended to illustrate reliable multicast using techniques described herein, such as placing a client MAC address in the header of a multicast packet. In the example of FIG. 6, the flowchart 600 starts at module 602 with identifying a client, wherein the client is associated with a client MAC address. The flowchart 600 continues at module 604 with putting the client MAC address in the header of a multicast packet. The flowchart 600 continues at module 606 with sending the multicast packet with the client MAC address to a wireless multicast destination. The flowchart ends at module 608 with receiving acknowledgement from the client associated with the client MAC address.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system, comprising:

an access point (AP) of a wireless AP (WAP) network configured to receive a multicast packet, the multicast packet having a header;

the access point configured to identify a single multicast packet recipient of a plurality of multicast packet recipients, the single multicast packet recipient being associated with a client MAC address and being the multicast packet recipient from the plurality of multicast packet recipients that is most recently associated with the access point;

the access point configured to add the client MAC address to the header of the multicast packet;

the access point configured to multicast, at a first data rate, the multicast packet with the client MAC address to a wireless multicast destination on the WAP network;

the access point configured to, if an acknowledgement from the single multicast packet recipient is not received within a time period, multicast, at a second data rate different from the first data rate, the multicast packet with the client MAC address to the wireless multicast destination on the WAP network; and means for receiving at the AP acknowledgement from the single multicast packet recipient associated with the client MAC address.

2. The system of claim 1, wherein the multicast packet is an 802.11-compatible packet.

3. A system, comprising:

a client media access control (MAC) determination module configured to determine a MAC address associated with a single client device of a plurality of client devices, the single client device being selected from among the plurality of client devices based on a plurality of times, each time from the plurality of times corresponding to the association of a respective client device from the plurality of client devices with an access point (AP) on a wireless AP (WAP) network;

a multicast packet acknowledgement module configured to add the MAC address in a header of a multicast packet associated with a multicast destination that includes the client device:

the multicast packet acknowledgement module configured to receive acknowledgement that the multicast packet was received at the single client device;

an 802.11 MAC module; and a processor configured to execute the client MAC determination module, the multicast packet acknowledgement module, and the 802.11 MAC module, the processor configured to send the multicast packet, at a first data rate, from the AP to the single client device on the WAP network by multicasting the multicast packet on a wireless medium; and the processor configured to send the multicast packet, if an acknowledgement from the single multicast packet recipient is not received within a time period, at a second data rate different from the first data rate, from the AP on the WAP network to the single client device on the WAP network by multicasting the multicast packet on the wireless medium.

4. The system of claim 3, wherein, after the MAC address has been added in the header of the multicast packet, the header of the multicast packet includes:

a multicast address;

a sender address;

a basic service set identifier (BSSID); and a designated address identifying the single client device.

5. The system of claim 3, further comprising the client device having:

an acknowledgement module configured to:

read the MAC address in the header of the multicast packet; and send an acknowledgement if the MAC address in the header of the multicast packet is identical to the single client device's MAC address;

an 802.11 MAC module; and a processor configured to execute the acknowledgement module and the 802.11 MAC module.

6. A method, comprising:

receiving a multicast packet at an access point (AP) of a wireless AP (WAP) network, the multicast packet having a header;

identifying a single multicast packet recipient of a plurality of multicast packet recipients, the single multicast packet recipient being associated with a client MAC address and being the multicast packet recipient from the plurality of multicast packet recipients that is most recently associated with the AP;

adding the client MAC address to the header of the multicast packet;

multicasting, at a first data rate, the multicast packet with the client MAC address to a wireless multicast destination on the WAP network; and if an acknowledgment from the single multicast packet recipient is not received within a time period, multicasting, at a second data rate different from the first data rate, the multicast packet with the client MAC address to the wireless multicast destination on the WAP network; and receiving at the AP acknowledgement from the single multicast packet recipient associated with the client MAC address.

7. The method of claim 6, wherein the multicast packet is an 802.11-compatible packet.

* * * * *